Feb. 23, 1965  K. E. GEREN ETAL  3,171,094
HETERODYNE AUTOCORRELATION TRANSPONDER
Filed Dec. 18, 1961  3 Sheets-Sheet 1

INVENTORS
KIETH E. GEREN
WILLIAM C. HUBBARD
WARREN A. SAUER
BY DONALD A. YOUNG

ATTORNEYS

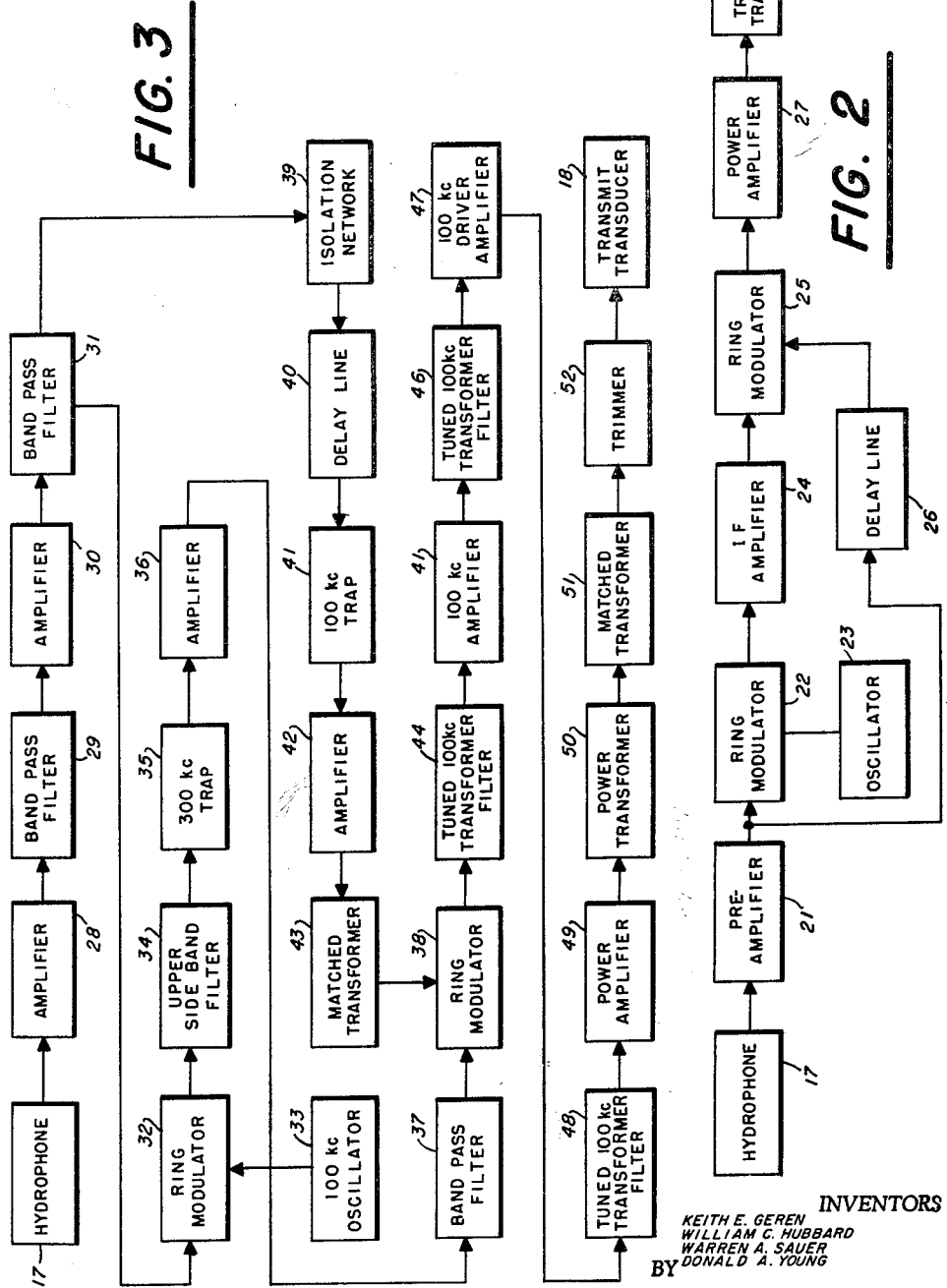

Feb. 23, 1965

K. E. GEREN ETAL 3,171,094

HETERODYNE AUTOCORRELATION TRANSPONDER

Filed Dec. 18, 1961

INVENTORS
KIETH E. GEREN
WILLIAM C. HUBBARD
WARREN A. SAUER
BY DONALD A. YOUNG

ATTORNEYS

United States Patent Office 3,171,094
Patented Feb. 23, 1965

3,171,094
HETERODYNE AUTOCORRELATION
TRANSPONDER
Keith E. Geren, San Diego, William C. Hubbard, Lemon
Grove, and Warren A. Sauer and Donald A. Young,
San Diego, Calif., assignors to the United States of
America as represented by the Secretary of the Navy
Filed Dec. 18, 1961, Ser. No. 160,374
14 Claims. (Cl. 340—2)
(Granted under Title 35, U.S. Code (1952), sec. 266)

The invention described herein may be manufactured and used by or for the Gorvernment of the United States of America for governmental purposes without the payment of any royalties thereon or therefor.

The present invention relates generally to marine navigation instruments and in particular is a heterodyne autocorrelation transponder for broadcasting a one hundred kilocycle per second sonar signal throughout a predetermined subaqueous area in response to sonar signals received from a navigating vessel to facilitate directing same along a preferred navigational path.

In the past, the armed forces have suffered great losses of men and equipment during an invasion of an enemy coast as a result of extensive mining operations carried out by the enemy along their shores and in their harbors. In order to minimize these losses, the coast approaches and navigable channels must be thoroughly swept and charted. This, in turn, places the sweeping ships in jeopardy. But if the time and effort required by the sweeping operation to clear any given area of mines could be reduced, the probability of their being detected and destroyed would be reduced as well.

This can be achieved by using the present invention because it is an improved navigation system that is sufficiently precise to accurately guide invasion vessels through swept channels otherwise too narrow for navigation therethrough by known conventional navigation means. It is intended to perform as a reference target for use with pinging sonars operating within the thirty to ninety-eight kilocycles per second frequency band when it is physically disposed as desired along the aforesaid swept narrow navigation channels, thereby facilitating the guiding of either sumberged or surface vessels therethrough.

Obviously, the instant invention has many other uses not connected with military operations such as, for example, providing safe passage of sea-going vessels through areas or channels made dangerous by shoals, shallow water, submerged objects, or other things in close proximity therewith in event normal navigation procedures are hampered by fog, darkness, or any other adverse effects.

It is, therefore, an object of this invention to provide an improved method and means for navigating a vessel along a predetermined path.

Another object of this invention is to provide a heterodyne autocorrelation transponder which broadcasts navigation signals having an acoustic gain not limited by acoustic feedback.

Still another object of this invention is to provide an improved transponder that will not interfere with detection and tracking of other targets by a sonar set operated in its normal mode.

A further object of this invention is to provide a transponder that develops a high maximum sound pressure for a given input.

Still another object of this invention is to provide a transponder having a processing gain over a broad band for coherent signals lying in a noise background.

Another object of this invention is to provide a heterodyne autocorrelation transponder that broadcasts a one hundred kilocycle per second acoustical signal in response to and during substantially the entire period of reception of acoustical signals within the thirty to ninety-eight kilocycle per second frequency band that have predetermined power and pressure levels.

Another object of the present invention is to provide an improved transponder that incorporates secure communication characteristics when operated in conjunction with an appropriately modified sonar set located on a navigating vessel.

Other objects and many of the attendant advantages of this invention will be readily appreciated as the same becomes better understood by reference to the following detailed description when considered in conjunction with the accompanying drawing wherein:

FIG. 2 is a block diagram of the system constituting this invention shown in its broadest concept.

FIG. 3 is a detailed block diagram of the system broadly illustrated in FIG. 2.

FIG. 4 is a schematic circuit diagram of the subject invention which discloses the detailed component parts interaction of the elements comprising the respective blocks of the system of FIG. 3.

Figure 5:
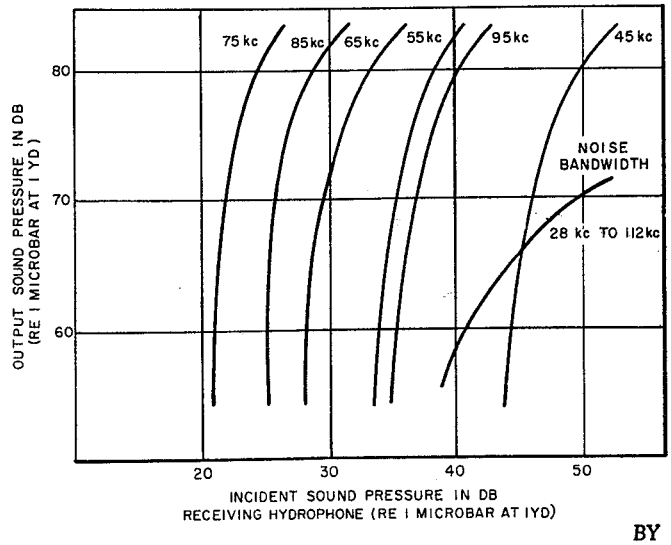

FIG. 5 graphically illustrates a family of curves showing the dynamic range of the subject transponder constituting this invention with output sound pressure plotted against incident sound pressure at various specific frequencies and at ordinary noise frequencies.

Figure 1:
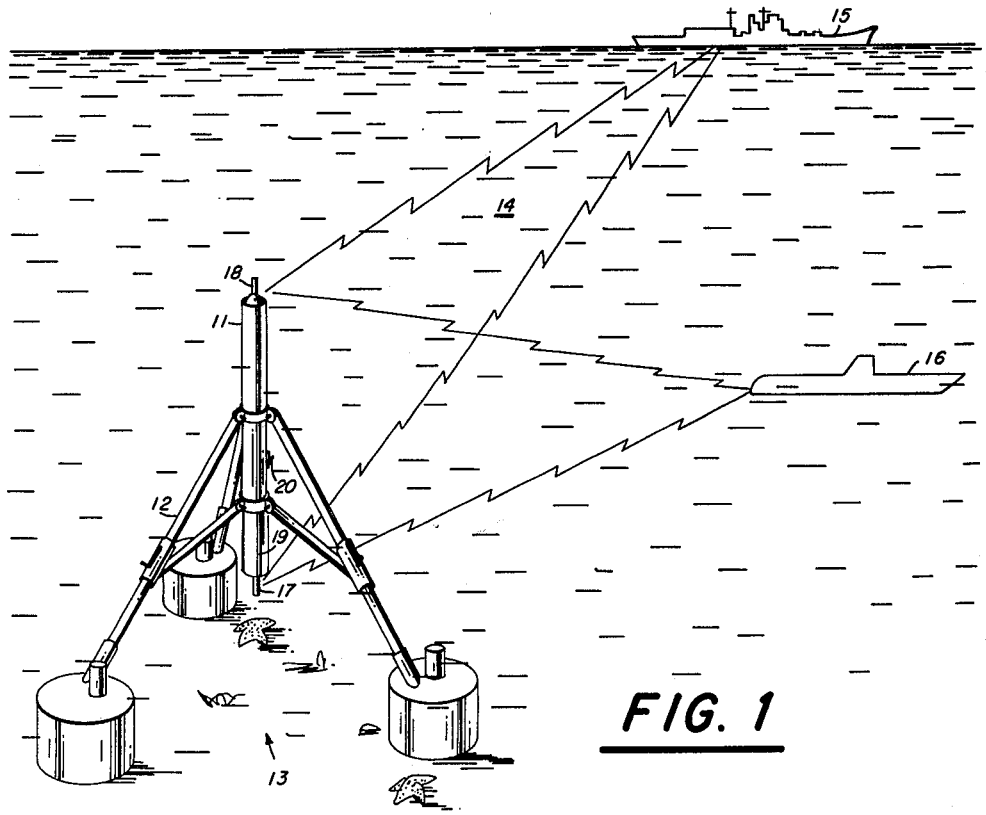
FIG. 1 is a pictorial view of the subject invention submerged in sea water and adapted for assisting in the navigation of both surface and submarine vessels.

Referring now to FIG. 1 of the drawings, there is shown a heterodyne auto-correlation transponder 11 of the type constituting this invention supported by a weighted tripod member 12 adapted for disposition at the ocean floor 13 within sea water 14. In this instance, transponder 11 is depicted as being mounted in such manner that its longitudinal axis aligns with the vertical from ocean floor 13, but it should be understood that any appropriate mounting which places the transducer in any preferred attitude may be employed without violating the scope of this invention. Either a surface vessel 15 such as a ship or the like, or a subsurface vessel 16 such as a submarine boat or the like, which contains a sonar system for transmitting acoustical energy throughout the aqueous medium may be navigated more easily along a predetermined path when operating in conjunction with transponder 11.

The subject transponder is herein disclosed as being cylindrical in form with a hydrophone 17 integrally mounted on one end thereof and a transmitting transducer 18 integrally mounted on the other end thereof. Although any appropriate shape and material may be used for housing the electrical system contained within transponder 11, the preferred embodiment depicted herein is composed of a hollow aluminum cylinder 19 having watertight headers respectively attached to each end thereof. Of course, the aforementioned hydrophone and transmitting transducers are likewise connected to their respective headers for watertight operation. A watertight switch 20 is so disposed on the external surface of transducer 11 that it may be manually or otherwise operated to timely energize and deenergize the electrical system contained therein as desired.

Referring now to FIG. 2, there is shown hydrophone 17 having its output applied through a preamplifier 21 to one of the inputs of a balanced ring modulator 22. An oscillator 23 supplies the other input of ring modulator 22 with a 100 kilocycle per second signal for heterodyning the signal received from preamplifier 21. The output from ring modulator 22 is then fed through an intermediate frequency amplifier 24 to another ring modulator 25. The output signal from preamplifier 21 is also appiled to a delay line 26, the output of which is supplied to another of the inputs of said ring modulator 25 for heterodyning the output of intermediate frequency amplifier 24 therewith. Ring modulator 25 supplies its output signal to a power amplifier 27, from which it is applied to the aforesaid transmit transducer 18.

For the purpose of clarity, the transponder system is again depicted in considerably more detail in FIGS. 3 and 4. Referring thereto, there is again shown receiving hydrophone 17 having its output applied to an amplifier 28 from which it is fed through a bandpass filter 29 which passes signals having frequencies between 30 and 98 kilocycles per second. Bandpass filter 29 should actually be so constructed as to accurately reject all 100 kilocycles per second signals and effectively trap all signals below 30 kilocycles per second. The output thereof is then amplified in an amplifier 30 and applied to another band pass filter 31 having electrical characteristics such that only signals having frequencies between 30 and 98 kilocycles per second will pass therethrough. The output of bandpass filter 31 is supplied to ring modulator 32 which also receives its heterodyning signal from a 100 kilocycle per second oscillator 33. The output of ring modulator 32 is supplied to an upper sideband filter 34 which passes frequencies between 130 and 198 kilocycles per second and traps both the frequencies below 130 kilocycles per second and at 200 kilocycles per second, the second harmonic of the aforementioned trapped 100 kilocycles per second trapped in bandpass filter 31. The output of upper sideband filter 34 is then applied through a 300 kilocycle trap 35 and an amplifier 36 to another bandpass filter 37 adapted for passing signals having frequencies between 130 and 198 kilocycles per second. The output thereof is supplied as one of the inputs to another ring modulator 38. The output from bandpass filter 31 containing signals having frequencies between 30 and 98 kilocycles per second is coupled through an isolation network 39, a delay line 40, a 100 kilocycle per second trap 41, an amplifier 42, and a matching transformer 43 to the other input of the aforesaid ring modulator 38.

The output of ring modulator 38 is then applied to a sharply tuned transfromer filter 44 that has been tuned for the passage of 100 kilocycles per second signals only. The output thereof is coupled through a 100 kilocycle amplifier 45 to another sharply tuned transformer filter 46 which only passes signals of 100 kilocycles per second. The output signal therefrom is then coupled through a 100 kilocycle driver amplifier 47, another tuned 100 kilocycle transformer 48 to a power amplifier 49. The output of power amplifier 49 is then transformed in a power transformer 50 and an impedance matching transformer 51, after which it is supplied to a fine-tuning trimmer 52 and then to the aforesaid transmitting transducer 18.

Because each of the foregoing elements represented by the respective blocks of FIG. 3 are conventional and well known per se, it should be readily understood that it is their unique arrangement, interconnection, and interaction which constitutes the subject invention. Obviously, the skilled artisan would be able to make and use this invention from the disclosure presented in FIG. 3 of the drawing which is supplemented by the teaching presented in this specification. However, in order to facilitate a more complete understanding of the subject invention and to disclose a preferred embodiment of the circuitry which may be incorporated as the aforementioned elements of the blocks FIG. 3, the component parts, the interconnection, and the interaction thereof are herewith depicted in greater detail in FIG. 4 for the convenience of the artisan in making and using it.

Briefly, the invention operates as follows:

Because the subject heterodyne autocorrelation transponder is intended to be a reference or navigational target for use with associated pinging sonars operating within the 30 to 98 kilocycles per second frequency band, when echo-ranged upon by a sonar signal within this band, it will respond by transmitting a 100 kilocycle per second signal during substantially the entire reception period. But during the time no sonar signal is being received, the transponder is essentially inactive because some of the amplifier stages utilize substantially class C operation, causing only an exceedingly small current drain of approximately 1 milliampere to occur at that time and, thus, considerably prolong the life of the dry cell batteries used as the power supply. Only when a suitably strong signal is received, does the transponder become activated sufficiently to transmit its 100 kilocycles per second signal at maximum output power, which ordinarily involves use of about 800 milliamperes of battery current. Of course, the aforementioned switch 20 is appropriately associated with the battery circuits for manually or otherwise turning them off and on as desired to likewise prevent a drain on the power supply when the subject transponder is not being used. To further prolong the standby life and operational life of the invention, extensive use is made of transistors and silicon diodes as appropriate amplifiers and rectifiers, respectively. However, it should be understood that these elements are merely preferable in this case and, obviously, substitution therefor may be made with any other electronic equivalent such as, for example, electron tubes, or appropriate solid state physics devices.

When signals are received from the sonar sets of navigating vessels such as the aforementioned ship 15 or submarine 16 by hydrophone 17 of the instant transponder, they are amplified by a two-stage preamplifier consisting of amplifier 28 and amplifier 30. But disposed between these amplifiers is bandpass filter 29 which effects passage of signals within the frequency band of 30 kilocycles per second to 98 kilocycles per second. This is accurately achieved by actually incorporating traps therein which will specifically eliminate all 100 kilocycles per second signals and all 23 kilocycles per second signals, if any, that may exist within the frequency band being passed. Hence, it can readily be seen that any 100 kilocycles per second signals received by hydrophone 17 during the transmission thereof by transmit transducer 18 by means of acoustical feedback will be effectively eliminated from the entire circuit at this point and thereby prevent adverse interference thereof within the remainder of the signal processing system. To ensure this is the case, however, bandpass filter 31 likewise passes the frequency band of 30 to 98 kilocycles per second and traps any 100 kilocycles per second signals that may have inadvertently seeped through the preceding filter.

The output of bandpass filter 31 is then applied to one of the inputs of ring modulator 32, the other input of which is fed with a 100 kilocycle signal from oscillator 33. Mixing of these two signals occur in ring modulator 32 and the output signal thereof is filtered by upper sideband filter 34 to remove the upper sideband therefrom in the frequency range of 130 to 198 kilocycles per second. In order to further refine the actual signal being processed, in this instance it has been found desirable to incorporate a 200 kilocycle trap as well as a trap which eliminates frequencies below 130 kilocycles per second, thereby reducing the possibility of unwanted signals such as perhaps the second harmonic of any 100 kilocycles per second signal which may not have been completely eliminated as intended. Likewise, in order to eliminate any third harmonics of said signal from the upper sideband signal now being processed, the output of upper sideband filter 34 is applied to a 300 kilocycle trap for this purpose. The output thereof thus consists of fairly pure sum signals from the aforesaid ring modulator that are amplified by a signal stage sum frequency amplifier and again filtered by bandpass filter 37 having a band pass of 130 to 198 kilocycles per second after which they are applied to one of the inputs of ring modulator 38.

The output signal from bandpass filter 31 is also applied through isolation network 39 to delay line 40. Isolation network 39, of course, is employed in order to prevent any interference whatsoever between the delay line circuit and the preceding signal processing elements. In this case, delay line 40 is a 100 microsecond lumped constant delay line, the delay of which has been designed to be short in time compared to the period of the received signal pings transmitted by the navigating vessels. After being delayed as necessary in delay line 40, the output signal therefrom is further purified by processing within the 100 kilocycles per second trap 41 to ensure that it falls within the 30 to 98 kilocycles per second frequency band before being amplified and fed through impedance transformer 43 as the other of the inputs of the aforementioned ring modulator 38. This delayed signal is mixed with the upper sideband signal from bandpass filter 37 to produce a 100 kilocycle per second difference frequency.

In order to ensure clarity, the following example will illustrate the process used. With an input of, say, 80 kilocycles per second arriving at hydrophone 17, the frequency of the signal from the upper sideband filter will be 180 kilocycles per second as the result of heterodyning the 80 kilocycles per second signal with the 100 kilocycles per second signal from continuously oscillating oscillator 33 in ring modulator 32. The input to delay line 40 is, of course, 80 kilocycles per second, similar to that originally received. Then, after being delayed, said 80 kilocycles per second signal is heterodyned with the aforesaid upper sideband 180 kilocycles per second signal in ring modulator 38 to produce a 100 kilocycles per second difference frequency as an output thereof.

Regardless of the frequency of the input signal, as long as it falls within the frequency band of 30 to 98 kilocycles per second it will be similarly processed to always produce a lower sideband 100 kilocycle per second output signal from ring modulator 38. This is due to the fact that the delayed signal is only delayed long enough to shift any noise signal frequency such that some effective cancellation thereof will occur but still allow the heterodyning of the delayed signal with the upper sideband portion of the original signal being processed in its own normal time. In other words, the signals from both the sum amplifier and the delay line amplifier must be present in the second ring modulator in order to obtain a 100 kilocycles per second difference signal. Measuring with respect to the time at which a ping is received, the signal will appear at the output of the delay line amplifier 100 microseconds later than at the output of the sum frequency amplifier. Inasmuch as 100 microseconds of the sum frequency signal passed before a reference signal with which to heterodyne appeared, the 100 kilocycle per second output ping will be shorter than the input ping by 100 microseconds. Because of the relative delay between the two inputs to ring modulator 38, noise and noise-like signals that consist of a multitude of short duration impulses will be heterodyned with unrelated impulses. The result is that wideband noise at the system input results in wideband noise at the output of ring modulator 38. This output signal from ring modulator 38 is then processed in transformer filters and amplifiers tuned to pass only 100 kilocycles per second signals. Because the bandwidth thereof is sufficient to pass the translated sonar pings but is too small to pass appreciable broadband energy, the signal-to-noise ratio at the output of the transponder, after such processing, is higher than the signal-to-noise ratio at the input to the transponder. This high signal-to-noise ratio signal is then power amplified, impedance matched, and trimmed by fine tuning before being applied to transmit transducer 18 for conversion thereof to proportional acoustical signals to be broadcast back through the subaqueous medium to the navigation vessels for reception thereof by their respective sonar systems. Furthermore, it should be noted that a certain power level of 100 kilocycle per second output signal from ring modulator 38 is required to drive the 100 kilocycle per second power amplifier to maximum output. With sine wave inputs to ring modulator 38, this level of output can be obtained. However, amplifiers 36 and 42 are then operating near their maximum output. When these inputs to ring modulator 38 are noise-like signals, however, the output of ring modulator 38 is dispersed in frequency with only a portion of this signal being within the band acceptance of the 100 kilocycle per second power amplifier. This signal is not sufficient to fully drive the 100 kilocycle per second power amplifier. Since amplifiers 36 and 42 are operating near their maximum output, it is not possible to significantly increase the noise input signals to ring modulator 38. The overall result is that there is no input level of noise signal that can cause the transponder to transmit at maximum output.

Since the geographical location of each of the plurailty of transponders marking a particular channel or path to be traveled by said vessels is known thereby, the position thereof is known accordingly and, consequently, may be navigated more safely and more rapidly.

As previously mentioned, the battery power is conserved due to the substantially class C operation of the power amplifier stages. Accordingly, this operation in effect, acts as a thresholder which prevents the transponder from being active even when it is disposed in an area of extreme sea noise. FIG. 5 shows the overall horizontal response characteristics of the subject transponder at several frequencies in the operating frequency, it can be seen that the transponder output varies from the minimum required output of 65 db above one microbar at one yard (equivalent to a zero level target at 500 yards) to a plus 83.5 db above one microbar at one yard with a change of incident sound pressure of 6 db. This results in a trigger type of operation which causes the device to respond strongly when and only when the input incident sound pressure is sufficient to activate it. The curve marked noise illustrates the inherent noise rejection in the transponder due to the autocorrelation principle.

Although the sound pressure level required to activate the transponder varies with the frequency received thereby, it should be noted that for all acceptable frequencies there is at least a minimum sound pressure level required to be received by the receiving hydrophone before any transmission will occur at all. For example, if the 75 kilocycle curve is considered, it will be noted that something more than 20 db of incident sound pressure is required for the transponder to transmit its 100 kilocycle per second signal to the navigating vessel. It should also be noted that a certain minimum requirement is necessary before any noise type of signals will actuate the subject transponder, and, for the most part, it has been found that the incident sound pressure thereof ordinarily must be greater than 35 db and usually occurs at some pressure approaching and approximating 40 db. Even if this level is approached so that noise-like signals do actuate the transponder, it can be seen from the family of curves of FIG. 5 representing the dynamic range of the transponder, that the pressure level of the sound output from the transponder is much greater when it is actuated by sine wave signals than when actuated by noise covering the 28 kilocycles per second to 112 kilocycles per second. Accordingly, as previously mentioned, the effect of spurious signals falling within the frequency band constituting noise is minimized from practically every standpoint, thereby optimizing the overall operation of the device of this invention.

Obviously, many modifications and variations of the present invention are possible in the light of the above teachings. It is, therefore, to be understood, that within the scope of the appended claims, the invention may be practiced otherwise than as specifically described.

What is claimed is:

1. A transponder for transmitting a signal of given frequency throughout a subaqueous medium in response to received sonar signals within a predetermined frequency range comprising a hydrophone for converting said received sonar signals into electrical output signals proportional thereto, means connected to the output of said hydrophone for heterodyning the electrical output signals therefrom with a predetermined frequency signal, means effectively coupled to the output of said heterodyning means for passing the upper sideband of said heterodyned signals, means effectively connected to the outputs of said upper sideband signal passing means and said hydrophone for mixing a delayed portion thereof therewith, and means coupled to the output of said mixing means for broadcasting the lower sideband signal therefrom throughout the aforesaid subaqueous medium.

2. The device of claim 1 wherein said means connected to the output of said hydrophone for heterodyning the electrical output signals therefrom with a predetermined frequency signal comprises a pre-amplifier, an oscillator, and a ring modulator having a pair of inputs one of which is connected to the output of said pre-amplifier and the other of which is coupled to the output of said oscillator.

3. The device of claim 1 wherein said means effectively coupled to the output of heterodyning means for passing the upper sideband of said heterodyned signals comprises an intermediate frequency amplifier.

4. The device of claim 1 wherein said means effectively connected to the outputs of said upper sideband signal passing means and said hydrophone for mixing a delayed portion thereof therewith comprises a delay line and another ring modulator connected thereto.

5. The device of claim 1 wherein the means coupled to the output of said mixing means for broadcasting the lower sideband signal therefrom throughout the aforesaid subaqueous medium comprises a power amplifier and a transducer connected to the output thereof.

6. A heterodyne autocorrelation transponder comprising in combination, a receiving transducer, means coupled to the output of said receiving transducer for passing thirty to ninety-eight kilocycle per second output signals, means for producing a one hundred kilocycle per second output signal, means connected to said passing means and said producing means for mixing the thirty to ninety-eight and the one hundred kilocycle per second output signals therefrom, means coupled to the output of said mixing means for passing one hundred thirty to one hundred night-eight kilocycle per second signals, means coupled to the output of said first mentioned passing means for delaying the thirty to ninety-eight kilocycle per second output signals therefrom one hundred microseconds, means interconnecting said second mentioned passing means and said delaying means for mixing the one hundred thirty to one hundred ninety-eight and the delayed thirty to ninety-eight kilocycle per second output signals therefrom, means coupled to the output of said last mentioned mixing means for passing and amplifying only the one hundred kilocycle per second output signals therefrom, and a transmitting transducer connected to the output of the aforesaid one hundred kilocycle per second output signal passing and amplifying means.

7. The device of claim 6 wherein said means coupled to the output of said mixing means for passing one hundred thirty to one hundred ninety-eight kilocycles per second signals comprises an upper sideband filter, a three hundred kilocycle per second trap coupled to the output of said upper sideband filter, an amplifier connected to the output of said trap, and a one hundred thirty to one hundred ninety-eight kilocycle per second bandpass filter coupled to the output of said amplifier.

8. The device of claim 6 wherein said means for producing a one hundred kilocycle per second output signal comprises an oscillator.

9. The device of claim 6 wherein said means coupled to the output of said first mentioned passing means for delaying the thirty to ninety-eight kilocycle per second output signals therefrom one hundred microseconds comprises a delay line.

10. The device of claim 6 wherein said means coupled to the output of said receiving transducer for passing thirty to ninety-eight kilocycle per second output signals includes a first amplifier, a first bandpass filter coupled to the output of said first amplifier, a second amplifier, and a second bandpass filter coupled to the output of said second amplifier.

11. The device of claim 10 wherein said first and second bandpass filters are further characterized by having first and second predetermined frequency traps respectively incorporated therein.

12. A heterodyne autocorrelation transponder comprising in combination, a hydrophone, a first amplifier coupled to the output of said hydrophone, a first bandpass filter connected to the output of said first amplifier, a second amplifier coupled to the output of said first bandpass filter, a second bandpass filter coupled to the output of said second amplifier, a first ring modulator having a pair of inputs and an output with one of said inputs coupled to the output of said second bandpass filter, an oscillator having its output connected to the other input of said pair of inputs of said first ring modulator, an upper sideband filter coupled to the output of said first ring modulator, means connected to the output of said upper sideband filter for trapping a predetermined frequency signal, a third amplifier coupled to the output of said trapping means, a third bandpass filter coupled to the output of said third amplifier, a second ring modulator having a pair of inputs and an output with one of said inputs connected to the output of said third bandpass filter, an isolation network coupled to the output of said second bandpass filter, a delay line coupled to the output of said isolation network, second means for trapping signals of predetermined frequency connected to the output of said delay line, a fourth amplifier coupled to the output of said second trapping means, an impedance matching transformer interconnecting the output of said fourth amplifier and the other input of said pair of inputs of said second ring modulator, a first tuned transformer filter connected to the output of said second ring modulator, a fifth amplifier connected to the output of said first tuned transformer filter, a second tuned transformer filter coupled to the output of said fifth amplifier, a transmit transducer, and means interconnecting said transmit transducer and the aforesaid second tuned transformer filter for driving said transmit transducer at predetermined frequency and power levels.

13. A heterodyne autocorrelation navigation transponder system for guiding a vessel along a predetermined path in response to received echo-ranging signals comprising in combination, a channel marker having a hollow substantially cylindrical housing, a pair of header end plates each of which is respectively mounted on each of the ends of said housing in watertight abutment, means connected to said housing for supporting same in a preferred attitude within a predetermined environmental medium, a first transducer mounted in sealed arrangement on the outer extremity of one of said pair of header end plates, a second transducer mounted in sealed arrangement on the outer extremity of the other of said pair of header end plates, means disposed within said hollow substantially cylindrical housing for effecting broadcast throughout said environmental medium of a predetermined signal by one of said transducers in response to an echo-ranging signal received by the other comprising a preamplifier coupled to the output of said other echo-ranging signal responsive transducer, a first ring modulator having one of the inputs thereof connected to the output of said preamplifier, an oscillator connected to the other input of said first ring modulator, an intermediate frequency amplifier coupled to the output of said first ring modulator, a second ring modulator having one of the inputs thereof coupled to the output of said intermediate frequency amplifier, a delay line interconnecting the output of said preamplifier and the other input of said second ring modulator, an amplifier means interconnecting the output of said second ring modulator and the input of the aforesaid broadcast transducer, and means mounted on said housing for actuating and deactuating the aforesaid predetermined signal broadcasting means as desired.

14. A heterodyne autocorrelation transponder navigation system for guiding a vessel along a predetermined path in response to received echo-ranging signals emanating therefrom comprising in combination, a channel marker having a hollow substantially cylindrical housing, a pair of header end plates each of which is respectively mounted on each of the ends of said housing in water tight abutment, means connected to said housing for supporting same in a preferred attitude within a predetermined environmental medium, a hydrophone mounted in sealed arrangement on the outer extremity of one of said pair of header end plates for receiving the echo-ranging signals emanating from said vessel, a transmit transducer mounted in sealed arrangement on the outer extremity of the other of said pair of header end plates, means connected to said hydrophone and transmit transducer and disposed within said hollow substantially cylindrical housing for effecting broadcasting throughout said environmental medium of a predetermined signal by said transmit transducer in response to the echo-ranging signal received by said hydrophone consisting of a first amplifier coupled to the output of said hydrophone, a first bandpass filter connected to the output of said first amplifier, a second amplifier coupled to the output of said first bandpass filter, a second bandpass filter coupled to the output of said second amplifier, a first ring modulator having a pair of inputs and an output with one of said inputs coupled to the output of said second bandpass filter, an oscillator having its output connected to the other input of said pair of inputs of said first ring modulator, an upper sideband filter coupled to the output of said first ring modulator, means connected to the output of said upper sideband filter for trapping a predetermined frequency signal, a third amplifier coupled to the output of said trapping means, a third bandpass filter coupled to the output of said third amplifier, a second ring modulator having a pair of inputs and an output with one of said inputs connected to the output of said third bandpass filter, an isolation network coupled to the output of said second bandpass filter, a delay line coupled to the output of said isolation network, second means for trapping signals of predetermined frequency connected to the output of said delay line, a fourth amplifier coupled to the output of said second trapping means, an impedance matching transformer interconnecting the output of said fourth amplifier and the other input of said pair of inputs of said second ring modulator, a first tuned transformer filter connected to the output of said second ring modulator, a fifth amplifier connected to the output of said first tuned transformer filter, a second tuned transformer filter coupled to the output of said fifth amplifier, and means effectively interconnecting said transmit transducer and the aforesaid second tuned transformer filter for driving said transmit transducer at predetermined frequency and power levels within said predetermined environmental medium.

References Cited by the Examiner
UNITED STATES PATENTS

| | | | |
|---|---|---|---|
| 1,610,779 | 12/26 | Hewett | 340—2 |
| 2,418,846 | 4/47 | Meacham | 340—2 |
| 2,428,799 | 10/47 | Hayes et al. | 343—7.5 |
| 2,476,639 | 7/49 | Thomas | 343—6.8 |
| 2,896,162 | 7/59 | Berger et al. | 343—100.7 |
| 2,977,568 | 3/61 | Roshon et al. | 340—3 |
| 3,012,222 | 12/61 | Hagemann | 340—6 |
| 3,039,094 | 7/62 | Anderson | 340—6 |
| 3,105,193 | 9/63 | Denton | 340—3 X |

CHESTER L. JUSTUS, *Primary Examiner.*

KATHLEEN H. CLAFFY, *Examiner.*